(12) United States Patent
Kazdaghli et al.

(10) Patent No.: US 12,555,406 B2
(45) Date of Patent: Feb. 17, 2026

(54) METHOD AND SYSTEM FOR ENCODING A LIST OF MINUTIAE OF A DACTYLOGRAM

(71) Applicant: IDEMIA PUBLIC SECURITY FRANCE, Courbevoie (FR)

(72) Inventors: Laurent Kazdaghli, Courbevoie (FR); Victor Videau, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 0 days.

(21) Appl. No.: 19/062,333

(22) Filed: Feb. 25, 2025

(65) Prior Publication Data

US 2025/0273009 A1  Aug. 28, 2025

(30) Foreign Application Priority Data

Feb. 26, 2024 (FR) ...................................... 2401839

(51) Int. Cl.
*G06V 40/12* (2022.01)
*G06V 10/82* (2022.01)

(52) U.S. Cl.
CPC .......... *G06V 40/1371* (2022.01); *G06V 10/82* (2022.01)

(58) Field of Classification Search
CPC . G06V 40/1371; G06V 10/82; G06V 40/1353
See application file for complete search history.

(56) References Cited

U.S. PATENT DOCUMENTS

| 4,135,147 A | * | 1/1979 | Riganati | G06V 10/20 |
| | | | | 382/209 |
| 2014/0205162 A1 | * | 7/2014 | Hara | G06V 40/1359 |
| | | | | 382/125 |
| 2017/0140192 A1 | * | 5/2017 | Lo | G06V 40/1324 |

(Continued)

OTHER PUBLICATIONS

Preliminary French Search Report & Written Opinion issued Dec. 2, 2024 in French Application 2401839 filed on Feb. 26, 2024, 10 pages.

(Continued)

*Primary Examiner* — Jonathan A Boyd
(74) *Attorney, Agent, or Firm* — Oblon, McClelland, Maier & Neustadt, L.L.P.

(57) ABSTRACT

Computer-implemented method for encoding a list of minutiae of a dactylogram, said method taking, as input data, the coordinates associated with each minutia from a list of minutiae of a dactylogram, and providing, as output datum, a fixed-size encoding vector which is representative of the list of the minutiae of said dactylogram, the method comprising the following steps:
(a) concatenating the coordinates of each minutia from the list of minutiae in the form of a source matrix of dimension;
(b) projecting the source matrix of dimension into a space of a dimension greater than the dimension of said source matrix using a projection model previously trained to form a projected matrix of dimension;
(c) inferring an inference matrix of dimension by applying, to the intermediate matrix, a previously trained graph neural network;

(Continued)

(d) aggregating the values of the inference matrix into a fixed-size vector using a previously defined aggregation model, said fixed-size vector being the fixed-size encoding vector which is representative of the list of the minutiae of the dactylogram.

14 Claims, 4 Drawing Sheets

(56) References Cited

U.S. PATENT DOCUMENTS

2021/0124899 A1\* 4/2021 Cazasnoves .............. G06T 7/10
2021/0406510 A1\* 12/2021 Kazdaghli ................ G06N 3/09

OTHER PUBLICATIONS

Engelsma et al., "Learning a Fixed-Length Fingerprint Representation", IEEE Transactions on Pattern Analysis and Machinge Intelligence, vol. 43, No. 6, 2021, 17 pages.

Tandon et al., "Transformer based Fingerprint Feature Extraction", 26th International Conference on Pattern Recognition (ICPR), 2022, 7 pages.

Jin et al., "Generating Fixed-Length Representation From Minutiae Using Kernel Methods for Fingerprint Authentication" IEEE Transactions on Systems, Man, and Cybernetics: Systems, vol. 46, No. 10, 2016, 14 pages.

\* cited by examiner

[Fig. 1]

[Fig. 6]
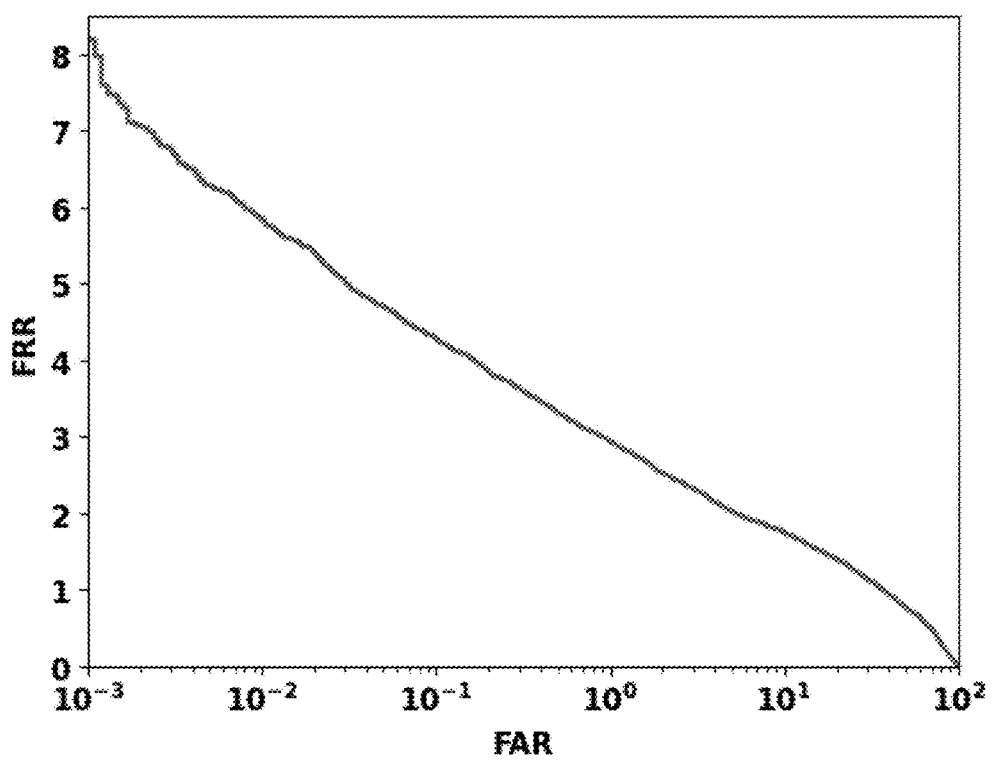

METHOD AND SYSTEM FOR ENCODING A LIST OF MINUTIAE OF A DACTYLOGRAM

TECHNICAL FIELD

The invention relates to a method for encoding a list of minutiae of a dactylogram. It also relates to a method and a system for identifying a list of minutiae among the lists of minutiae from a database, the minutiae being encoded according to said encoding method.

TECHNICAL BACKGROUND

Dactyloscopy is a method for identifying individuals which is based on the utilization of dactylograms, which are also known by the expressions "fingerprints" and/or "palmprints". This method is notably used by judicial anthropometry services or by civil identification systems during, for example, administrative procedures, when crossing borders or when accessing secure locations.

Dactylograms are patterns formed by the traces left on surfaces by the dermatoglyphics of the fingers and/or the palms of the hand. The dermatoglyphics are the superficial furrows formed on the palms, the soles and the tip of the fingers by the dermal ridges and arranged in lines or whorls. They are specific to each individual and the patterns which they form constitute an anthropometric "identity card" thereof by virtue of which they may be identified.

In contrast to authentication, where a dactylogram acquired for an individual is compared to a single or very limited number of reference dactylograms (1:1), identifying an individual on the basis of a dactylogram requires this dactylogram to be compared with many other dactylograms previously acquired from several individuals (1:N) and generally stored in a database. Because dactylograms are patterns with complex features and the number of comparisons which are necessary during an identification may become very high, the identification process may remain long despite the computing resources of the data processing devices which are currently available. In order to reduce the time which is necessary to conduct this operation, it is known practice to classify dactylograms into various classes based on certain morphological features of the dermatoglyphics. By way of examples, these morphological features may be the general form of the dermatoglyphics (orientation of the loops, arches, spirals etc.) according, notably, to the categories of Henry Faulds, Francis Galton and Edward Henry, the outline of the ridges, the "minutiae" constituted by single points along the ridges (termination of a ridge, bifurcation etc.), the form of the ridges, the pores or indeed the scars.

Among these morphological features, minutiae are subjected to particular attention since, because of their singularity, comparing minutiae between dactylograms contributes to providing probative value to any identification attempt. For example, according to the Balthazar rule, 17 or 18 common minutiae are sufficient to certify the concordance between two dactylograms or, according to the Locard rule, dactyloscopic proof is obtained when two dactylograms exhibit no discordance and share 12 common minutiae.

It is common to classify minutiae into two categories: bifurcations and terminations. Bifurcations comprise right or left bifurcations, lakes and bridges. Terminations comprise right or left terminations, islands and hooks. However, this distribution into two categories has no normative or limiting character. There are other combinations thereof, so what is generally meant by "minutia" is any singular point and/or any discontinuity which is present along the ridges of the dermatoglyphics.

Minutiae are generally represented and stored in databases in the form of coordinates in a three-dimensional space, as described notably in the ISO/IEC 19794-2:2005 standard, Information Technology—Biometric Data Interchange Formats—Part 2: Finger Minutiae Data, 2005. The two first dimensions correspond to the abscissa and the ordinate, respectively, of the minutia in a reference system of the dactylogram. The third dimension corresponds to the orientation angle of the minutia with respect to horizontal axis of this same reference system. Thus, in contrast to dactylograms stored in image form, storing minutiae in this form on a computer requires less memory space. They make better interoperability of the databases possible and reduce the computing time during identification or authentication operations.

All these advantages contribute to the adoption of minutiae as first-choice features when processing dactylograms with a view to forming biometric identification databases, to the point that they very often constitute the only data available. In other words, in these databases, images of dactylograms are not stored and only the geometrical coordinates of the points constituting the minutiae are.

The methods and systems for identifying dactylograms are either manual, semi-automated or fully automated. Since the size of databases and the computing powers of data processing devices are growing incessantly, automated fingerprint identification systems (AFISs) based on the utilization of minutiae are used more and more. They make it possible to quickly and efficiently analyze a list of candidate dactylograms which may correspond to a dactylogram the owner of which is to be identified.

The automated identification methods implemented by this type of system generally comprise two main steps. In a first step, one or more screening algorithms are used which make it possible to quickly eliminate the candidate dactylograms which share the fewest common features with the dactylogram the owner of which there is a desire to identify. In a second step, one or more algorithms, ordinarily slower and more precise, compare said dactylogram with the remaining candidate dactylograms in order to establish a list of the best matches.

Among automated identification methods, those based on the implementation of neural networks generally require a previous step of encoding the dactylograms, whether they are provided in the form of images, of lists of minutiae or of a combination thereof. During this encoding step, the relevant distinctive features of the dactylograms are extracted, selected and then transcribed as instructions which can be decrypted by a data processing device, such as a computer, and which are suitable to be subjected to computational and/or combinatory operations. The encoding step is often an integral part of the identification methods.

Su et al., MRA-GNN: Minutiae Relation-Aware Model over Graph Neural Network for Fingerprint Embedding. arXiv preprint arXiv:2307.16416, 2023 describes a method for encoding dactylograms which are based on their minutiae. In a first stage, the method encodes each minutia of each dactylogram from a plurality of candidate dactylograms as graphs which are representative of their topological relationships. In a second stage, each dactylogram is encoded as a graph which is representative of the correlation structures between nearest neighbor dactylograms on the basis of the graphs relating to each of their minutiae. This encoding is obtained using a graph neural network (GNN)

implemented on the dactylograms provided in the form of images the minutiae of which are extracted using a pre-encoder. The graphs take the form of vectors.

The use of the method as a means of identification is limited. It is, indeed, only suitable for identifying a set of dactylograms comprising several dactylograms to be identified. Each of them must previously be encoded as a graph according to the same first neighbor approach before being able to be compared with each candidate dactylogram via a criterion applied to the vector product of the vectors which are representative of their graph. In other words, the method is not suitable for identifying a single and unique dactylogram provided as input datum.

Grosz et al., Minutiae-guided fingerprint embeddings via vision transformers. arXiv preprint arXiv:2210.13994, 2022 describes a method for encoding images of dactylograms in the form of a fixed-size vector. The minutiae of each dactylogram image are firstly extracted and represented in the form of a two-channel heat map. Then, the channels of each heat map and the image of the corresponding dactylogram are concatenated together, flattened and provided as input data to a Vision Transformer neural network such as that described in VASWANI et al. Attention is all you need. Advances in neural information processing systems, vol. 30, 2017. A dactylogram is identified among a set of candidate dactylograms via a comparison of the encoded vectors, the result of which is combined with those of identification methods based on convolutional neural networks.

TANDON et al., Transformer based fingerprint feature extraction, 26th International Conference on Pattern Recognition (ICPR), 2022, describes a method for encoding a dactylogram image using a convolutional neural network based on a Convolutional Transformer approach. The method makes it possible to encode a general representation of the dactylogram, predict a list of minutiae and encode a local representation of the list of the predicted minutiae. A dactylogram is identified among a set of candidate dactylograms in several conditional steps. Firstly the overall representations of the images of the dactylograms are compared. If the overall similarity score is greater than a threshold value, the identification is confirmed. If it is below, a local similarity score is calculated on the basis of the comparison of the local representations which are based on the minutiae. An average score between the overall similarity score and the local similarity score is then established.

SUMMARY OF THE INVENTION

Technical Problem

A first drawback of the methods for encoding images of dactylograms, whether or not they comprise encoding the minutiae extracted from said dactylogram images, is that they require the images of the dactylograms to be available in the existing databases. Now, either for storage reasons or by choice, the existing databases may be devoid of such images. These methods may be notably unsuitable for old databases in which only the minutiae are available.

A second drawback of the methods for encoding images of dactylograms is their lack of interoperability Being based on images, they may require a certain image format and/or quality. Now, the format and the quality of the images of dactylograms of the existing databases may vary from one database to another. In order to be able to be put in place these methods may therefore require particular adaptations according to the specifics of each of the database, reducing all the more the interoperability between these databases.

A drawback of the current methods for encoding the minutiae as graphs which are representative of their topological relationships using graph neural networks is their unacceptable inability to identify a single and unique dactylogram among a set of candidate dactylograms. Furthermore, they require more or less arbitrary choices to be made among a set of possibilities on the nearest neighbors in order to construct the correlation structures between dactylograms on the basis of the graphs relating to their minutiae. Now, since the possibility space is almost infinite, making such choices necessarily involves neglecting some solutions some of which may prove to be optimal.

There is therefore still a need to improve the methods for encoding the minutiae in order not only to reduce the computing times during an identification operation but also to ensure better interoperability of the databases. In particular, there is a need for methods for encoding the minutiae which are capable of operating on any type of databases comprising lists of minutiae and/or on systems the storage capacities and/or the computing resources of which are limited.

Technical Solution

According to a first aspect of the invention, a computer-implemented method for encoding a list of minutiae of a dactylogram is provided, said method taking, as input data, the coordinates of each minutia from a list L of n minutiae of a dactylogram in an M-dimensional space E, and providing, as output datum, a fixed-size encoding vector VE which is representative of the list L of the n minutiae of said dactylogram, the method comprising the following steps:

(a) concatenating the coordinates of each minutia from the list L of n minutiae in the form of a source matrix MS of dimension (n, m);

(b) projecting the source matrix MS of dimension (n, m) into a P-dimensional space F, the number of dimensions P of the space F being greater than the number of dimensions M of the space E of the coordinates of each minutia, said projection being performed using a projection model Proj previously trained to form a projected matrix MP of dimension (n, p);

(c) inferring an inference matrix MF of dimension (n+1, p) by applying, to the intermediate matrix MI, a previously trained graph neural network;

(d) aggregating the values of the inference matrix MF into a vector VE of fixed size (1, p) using a previously defined aggregation model, said fixed-size vector being the fixed-size encoding vector VE which is representative of the list L of the minutiae of the dactylogram.

Advantageous embodiments are described below.

According to a second aspect of the invention, a data processing device comprising means for implementing the method according to any one of the embodiments of the first aspect of the invention is provided.

According to a third aspect of the invention, a computer program comprising instructions which, when the program is executed by a computer, lead the latter to implement the method according to any one of the embodiments of the first aspect of the invention is provided.

According to a fourth aspect of the invention, a storage medium comprising instructions which, when they are executed by a computer, lead the latter to implement the method according to any one of the embodiments of the first aspect of the invention is provided.

According to a fifth aspect of the invention, a method for identifying a dactylogram among a set of dactylograms comprising an encoding step using an encoding method according to the first aspect of the invention is provided.

According to a sixth aspect of the invention, a system for identifying a dactylogram among a set of dactylograms in order to implement a method according to the fifth aspect of the invention is provided.

Advantages

A first advantage of the invention is that the encoding does not required any image of dactylograms. It may therefore be utilized on any dactylogram database comprising lists of minutiae. In particular, it can be utilized on old databases which are devoid of dactylogram images as well as on more recent databases comprising images from which minutiae may be extracted.

A second advantage of the invention is the possibility of encoding lists of minutiae as a fixed-size vector whatever the size of the list provided as input datum. Comparing pairs of dactylograms the number of minutiae available for each of which is different is thus made possible. The method may then be implemented simultaneously on different databases comprising different number of minutiae and/or on lists of minutiae of different size within the same database. The interoperability of the databases is reinforced in their utilization including between the old databases which are devoid of dactylogram images and the more recent databases comprising images from which minutiae may be extracted.

A third advantage of the invention is the insensitivity of the encoding to the number and to the order of the minutiae in lists of minutiae provided as input data. The statistical noise is reduced and the results of the subsequent identification operations based on the comparison of the encoding vectors are more precise.

BRIEF DESCRIPTION OF THE DRAWINGS

FIG. 6 is a graphical representation of the false negative rate (FRR) as a function of the false positive rate (FAR) during a comparison of lists of minutiae which are encoded according to an example of an embodiment of the invention.

DETAILED DESCRIPTION OF EMBODIMENTS

Figure 1:
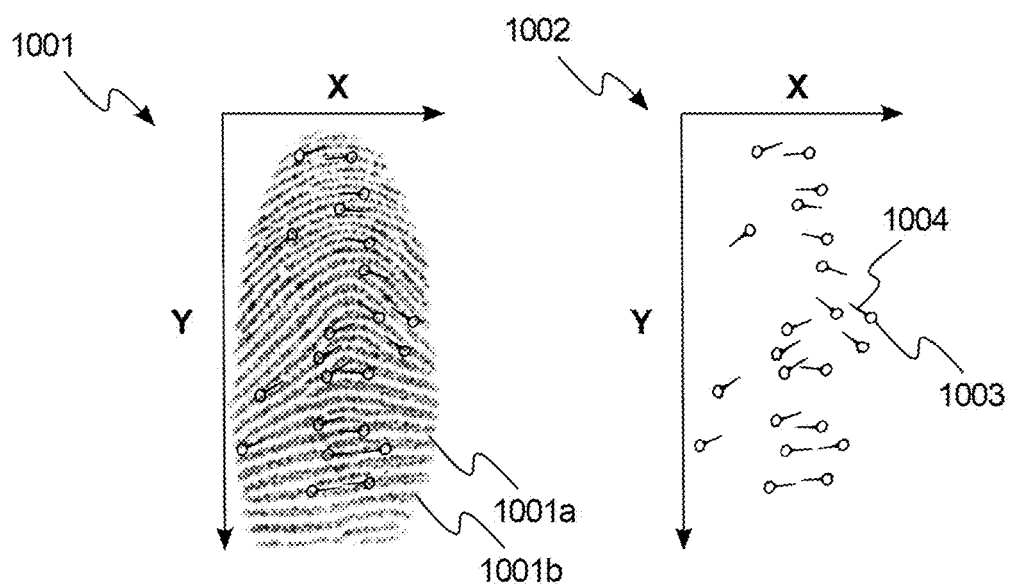
FIG. 1 is a graphical representation of an example of a list of minutiae of a finger dactylogram.

With reference to FIG. 1, a finger dactylogram 1001 is a pattern formed by the traces left on surfaces by the dermatoglyphics of a finger. This pattern shows the curvatures of the furrows 1001a and ridges 1001b of the papillary or epidermal folds which are present on the tip of the finger. They generally form lines, loops and whorls.

The minutiae 1002 are singular points and/or discontinuities which are present along the ridges. In FIG. 1, they are represented by circles 1003 provided with a segment 1004. In the left-hand part of the figure, they are superimposed on the image of the dactylogram 1001. In the right-hand part, they are grouped together in the form of a cloud, without the image of the dactylogram.

The minutiae may be, for example, bifurcations such as right or left bifurcations, lakes and bridges, or terminations such as right or left terminations, islands and hooks. They may also be combinations of these various types.

According to the ISO/IEC 19794-2:2005 standard, Information Technology—Biometric Data Interchange Formats—Part 2: Finger Minutiae Data, 2005, it is common to reference each minutia 1002 by its coordinates in a three-dimensional space using a tuple or vector of dimension three (1, 3). The first two dimensions of this tuple are the abscissa and the ordinate of the singular point representing the minutia 1002 in a Cartesian reference system X, Y of the dactylogram 1001, and the third dimension is the orientation angle of the ridge at the minutia with respect to the horizontal abscissa axis X. In FIG. 1, the abscissa and the ordinate of each minutia are represented by the circle 1003, and the orientation angle is represented by the segment 1004 attached to this circle.

Figure 2:
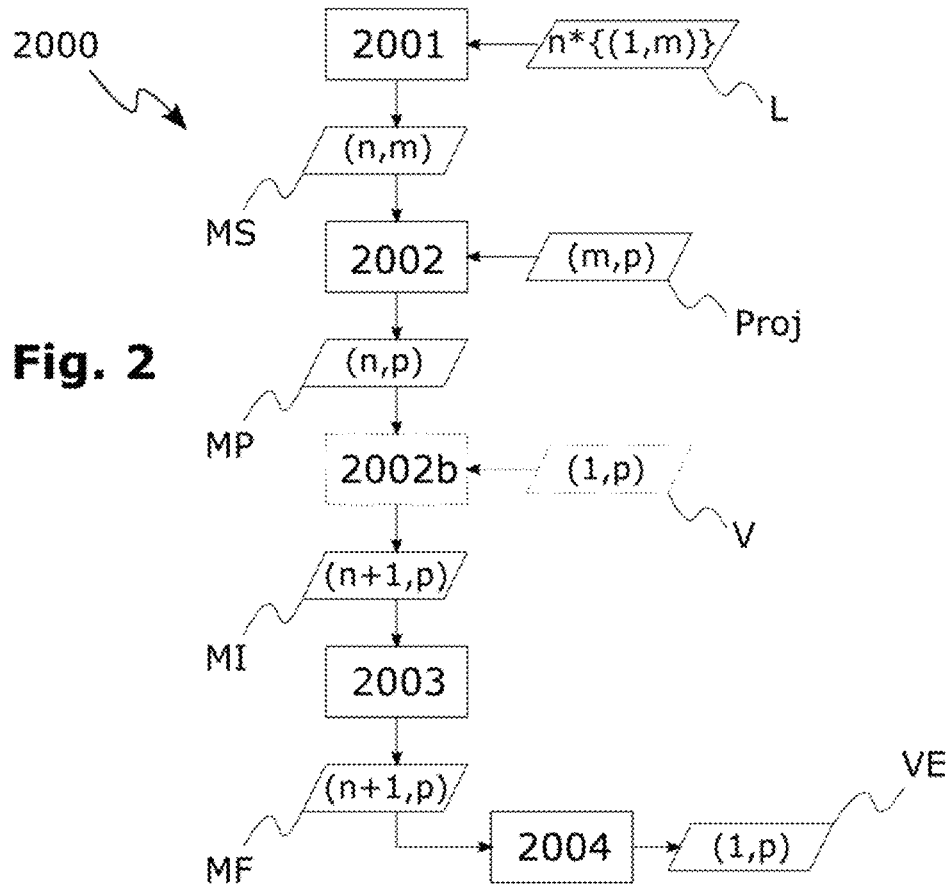
FIG. 2 is a flowchart of the method according to the first aspect of the invention.

According to a first aspect of the invention, with reference to FIGS. 1 & 2, a computer-implemented method 2000 for encoding a list of minutiae 1002 of a dactylogram 1001 is provided, said method 2000 taking, as input data, the coordinates of each minutia from a list L of n minutiae 1002 of a dactylogram 1001 in an M-dimensional space E, and providing, as output datum, a fixed-size encoding vector VE which is representative of the list L of the n minutiae 1002 of said dactylogram 1001, the method 2000 comprising the following steps:

(a) concatenating 2001 the coordinates of each minutia from the list L of n minutiae 1002 in the form of a source matrix MS of dimension (n, m);

(b) projecting 2002 the source matrix MS of dimension (n, m) into a P-dimensional space F, the number of dimensions P of the space F being greater than the number of dimensions M of the space E of the coordinates of each minutia, said projection being performed using a projection model Proj previously trained to form a projected matrix MP of dimension (n, p);

(c) inferring 2003 an inference matrix MF of dimension (n+1, p) by applying, to the intermediate matrix MI, a graph neural network previously trained to classify the dactylograms from a set of dactylograms on the basis of a list L of a plurality of minutiae of said dactylograms;

(d) aggregating 2004 the values of the inference matrix MF into a vector VE of fixed size (1, p) using a previously trained aggregation model, said fixed-size vector being the fixed-size encoding vector VE which is representative of the list L of the minutiae 1002 of the dactylogram 1001.

In the context of the present invention, a "graph neural network" (GNN) is understood to mean a graph neural network as defined in the field of statistical or machine learning, notably neural networks based on the utilization of feature vectors (embeddings) to encode the properties of each node (node embedding) and of each edge (edge embedding) of information which may be represented in the form of a graph.

In the context of the present invention, "coordinates of each minutia" is understood to mean the coordinates of any referencing system or format which makes it possible at least to characterize the position and the orientation of each minutia in an M-dimensional space E. This interpretation covers both the referencing system or format described in the ISO/IEC 19794-2:2005 standard, Information Technology—Biometric Data Interchange Formats—Part 2: Finger Minutiae Data, 2005, and any other system or format with equivalent functions which may differ therefrom.

According to one preferred embodiment, the space E is 3-dimensional and the coordinates of each minutia 1002 correspond to the values of its abscissa, its ordinate and its orientation angle in the reference system (X, Y) of the dactylogram 1001, respectively. The coordinates of a minutia 1002 may then be represented in the form of a tuple or vector of dimension (1, 3) in a three-dimensional space E (M=3). These coordinates comprise the abscissa and the ordinate of the minutia in a Cartesian reference system X, Y of the dactylogram 1001, and the orientation angle of the ridge at the minutia with respect to the horizontal abscissa axis.

Figure 3:
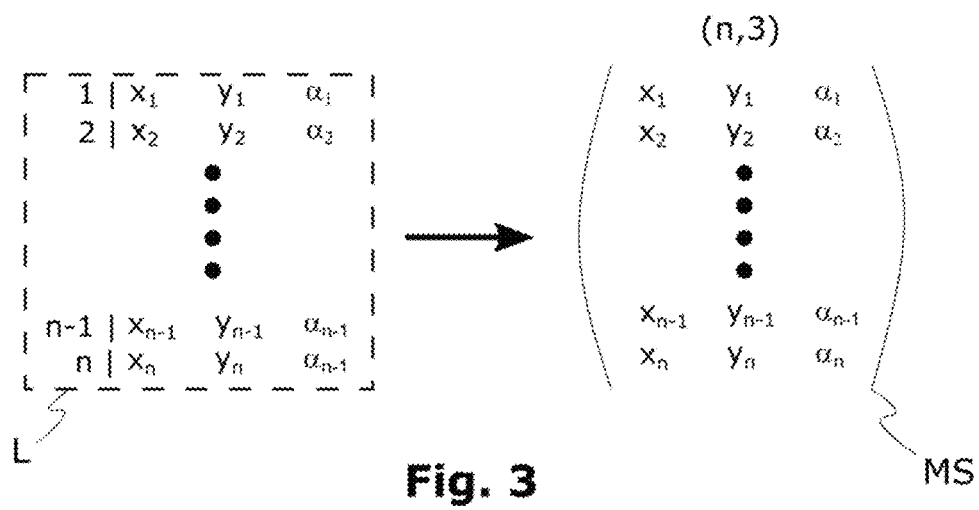
FIG. 3 is a schematic representation of a representation of a list of minutiae in the form of a matrix.

For example, on the basis of the referencing format described in the ISO/IEC 19794-2:2005 standard, Information Technology—Biometric Data Interchange Formats—Part 2: Finger Minutiae Data, 2005, with reference to FIG. 3, in accordance with step (a) of the method, a list L of 'n' minutiae 1002 may be represented in the form of a source matrix MS of dimension (n, 3) by concatenating their vectors of dimension (1, 3), the columns representing the abscissa 'x', the ordinate 'y' and the orientation angle 'α' of the minutia. In this step (a), for n minutiae, the values of the abscissa, of the ordinate and of the angle of each minutia are concatenated vertically in order to form the n rows of the source matrix MS.

Equivalently, the arrangement of the values may be transposed: the values of the abscissa, of the ordinate and of the angle of each minutia are concatenated horizontally in order to form the n columns of the source matrix. For reasons of conciseness, in the remainder of this document, reference is made solely to the arrangement of the values of the abscissa, of the ordinate and of the angle of each minutia in columns in order to form the n rows of the source matrix. A simple transposition operation makes it possible to change from one arrangement to the other.

In step (b), the source matrix MS of dimension (n, m) is subjected to a projection Proj into a P-dimensional space F, the number of dimensions P of the space F being greater than the number of dimensions M of the space E of the coordinates of each minutia. This projection is carried out using a projection model Proj previously trained to form a projected matrix MP of dimension (n, p). It makes it possible to enrich the information relating to the coordinates of the minutiae with new dimensions which will then serve as a medium for information inferred during step (d) of inference by the graph neural network. The nature of the inferred information is determined during the training of the projection model and that of the graph neural network of step (d). For example, this additional information may, after training, be certain topological relationships or correlation structures between minutiae.

According to some embodiments, the projection model Proj is a projection matrix MP into a space F the number P of dimensions of which is arbitrary, preferably into a space F of arbitrary dimension P of at least 32 times the dimension M of the space E of the coordinates of the minutiae from the list L of minutiae 1002. On the basis of the example of the source matrix MS of dimension (n, 3) described above, the projection model Proj may be a projection matrix of dimension (3, 128) which makes it possible to project the source matrix MS into a space of dimension at least 32 times the dimension M=3 of the coordinates of the minutiae 1002. The projected matrix MP, obtained by applying the projection matrix to the source matrix via a simple matrix computation, has a dimension (n, 128). Both for this example and more generally, it should be underlined that the dimension of the projection matrix does not depend on the number of minutiae of the source matrix.

In step (c), the intermediate matrix MI is provided, as input data, to a previously trained graph neural network in order to infer an inference matrix MF. The graph neural network is trained previously in order to classify the dactylograms of a set of dactylograms on the basis of a list L of a plurality of minutiae of said dactylograms.

The graph neural network and its training method are of any suitable type. The training method may notably be unsupervised, supervised or self-supervised learning, or a combination thereof. In particular, it may be "identity" supervised learning in which the graph neural network is trained to classify each list of minutiae corresponding to a dactylogram in a training set into an identity or class corresponding to said dactylogram. In other words, each list of minutiae in the training set is considered to be a unique identity or class of a dactylogram during learning.

According to a preferred embodiment, the graph neural network is a transformer neural network. It is known practice from the prior art to implement this type of neuron on dactylogram images. In the context of the present invention, it has been observed, surprisingly, that this type of network, when implemented not on an image of the minutiae but on their coordinates, achieves similar or even better performance in terms of contextual sequencing and encoding. The result is that, contrary to what was expected, the coordinates of the minutiae, which constitute information which is a priori less rich than dactylogram images with regard to their topological relationships, are sufficient to benefit from the performance of a transformer network while at the same time reducing complexity, the amount of data to be processed and computing load.

According to some advantageous embodiments, the transformer neural network comprises a succession of at least 9 multi-head self-attention mechanism layers alternating with a multi-layer perceptron neural network, and is devoid of positional encoding. The absence of positional encoding makes it possible to make the method insensitive to the permutation of the minutiae in the list of minutiae. In other words, the order in which the tuples of each minutia are arranged in a list of minutiae has no impact on the results of the encoding of said list. The multi-head self-attention mechanism layers are described in VASWANI, Ashish et al. Attention is all you need. Advances in neural information processing systems, vol. 30, 2017.

In step (d), the values of the inference matrix MF are aggregated into a fixed-size encoding vector VE using a previously defined aggregation model. By way of illustration, on the basis of the example of the intermediate matrix of dimension (n+1, 128) described above, this aggregation consists in reducing said matrix to a single row in order to form a fixed-size vector of dimension (1, 128).

According to some embodiments, the aggregation model is a weighted sum, for each dimension P of the space F, between the values of the inference matrix MF corresponding previously to the coordinates of the vector of the dummy minutia V, the average of the values of the inference matrix MF corresponding previously to the projected matrix MP and the maximum of the values of the inference matrix MF.

According to certain embodiments, the method further comprises, after step (b) and before step (c), a step (b2) of concatenating (2002*b*) the projected matrix with a coordinate vector of a dummy minutia V of dimension (1, p) in order to form an intermediate matrix MI of dimension (n+1, p), the coordinate vector of the dummy minutia V having been previously determined during the training of the graph neural network.

In step (b2), the projected matrix MP obtained in step (b) is concatenated with a coordinate vector of a dummy minutia V of dimension (1,p). On the basis of the example of the projected matrix MP of dimension (n, 128) described above, its concatenation with the coordinate vector of a dummy minutia V of dimension (1, 128) makes it possible to obtain an intermediate matrix MI of dimension (n+1, 128).

The coordinate vector of a dummy minutia V has the function of a classification token, as is commonly used in graph neural networks, notably in transformer graph neural networks. In this regard, the articles by VASWANI et al. Attention is all you need. Advances in neural information processing systems, vol. 30, 2017 and DOSOVITSKIY et al. An image is worth 16×16 words: Transformers for image recognition at scale. arXiv preprint arXiv:2010.11929, 2020 may be consulted. Typically, the values of the coordinate vector of a dummy minutia V can be random, for example according to a normal distribution, during its initialization. These values are then optimized during the process of previous training of the graph neural network used in step (c).

Figure 4:
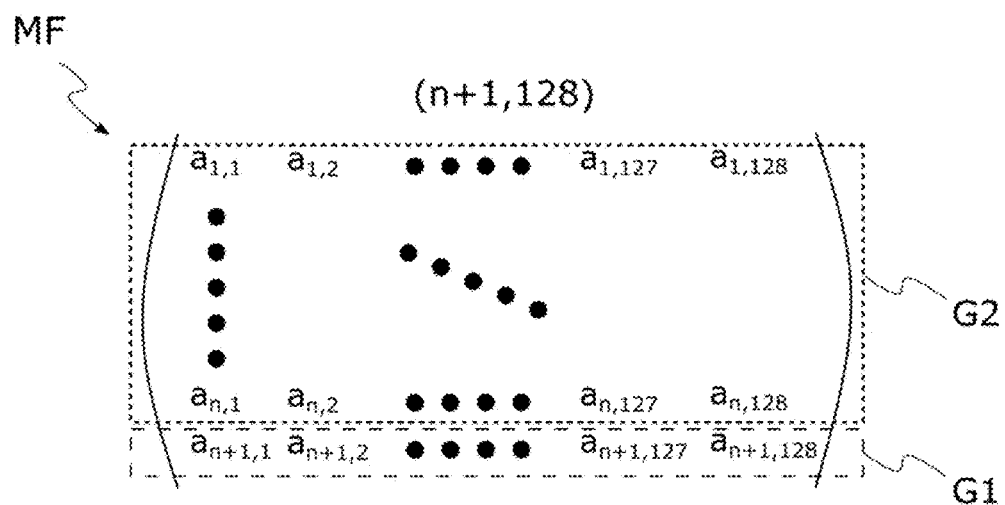
FIG. 4 is a schematic representation of an example of an arrangement of the values in an intermediate matrix in accordance with the first aspect of the invention.

By way of illustration, with reference to FIG. 4 and on the basis of the previous example of the inference matrix MF of dimension (n+1, 128), each column corresponds to one of the P dimensions of the space F. The rows of the inference matrix MF may be organized into two groups:
(G1) a row previously corresponding to the coordinate vector of the dummy minutia;
(G2) 'n' rows previously corresponding to the projected matrix MP before its concatenation with the coordinate vector of the dummy minutia MF.

For each of the 128 columns, the weighted sum is then performed between three terms corresponding to the value of the group (G1), the average of the values of the 'n' rows of the group (G2) and to the maximum of the values of n+1 rows of the whole of the inference matrix MF, respectively. The weighting factors are preferably all positive and their sum is equal to unity. Their values are determined by a statistical learning method such as gradient descent, notably during the training of the projection model and that of the graph neural network of step (d).

According to certain embodiments, the method further comprises, before step (a), a previous step of normalizing the coordinates of each minutia, in which the orientation angles are replaced by the values of their sine and their cosine. In other words, the value of the orientation angle of each minutia from the list of minutiae is replaced by two values corresponding to the sine and the cosine of said angle, or to the cosine and the sine of said angle, respectively. Such a normalization step is particularly advantageous in that it makes it possible to reduce the sensitivity of the graph neural network when there is a change, between two or more minutiae, from an orientation angle of 359° to 0°. In the specific context of encoding a list of minutiae, precision and reliability during inference of the inference matrix are improved significantly.

In the case where the coordinates of a minutia are represented in the form of a tuple or a vector, this previous normalization step causes a change in the dimension of said tuple or vector. By way of illustrative example, for a list of the coordinates of a minutia which is represented in the form of a tuple or a vector of dimension (1, 3) comprising the abscissa and the ordinate of the minutia in a Cartesian reference system X, Y of the dactylogram and the orientation angle of the ridge at the minutia with respect to the horizontal abscissa axis, at the end of this normalization step, this tuple or this vector becomes a tuple or a vector of dimension (1,4). Among the four dimensions in a column, the first two correspond to the abscissa and the ordinate of the minutia in the Cartesian reference system X, Y of the dactylogram, and the third and fourth correspond to the sine, respectively cosine, and to the cosine, respectively sine, of the orientation angle.

As a result of this change in dimension of the tuples or vectors representing the coordinates of the minutiae, still within the context of the preceding examples, the dimensions of the source matrix and of the projection matrix in steps (a) and (b) are modified: the dimension of the source matrix is (n, 4) and that of the projection matrix is (4, 128).

Figure 5:
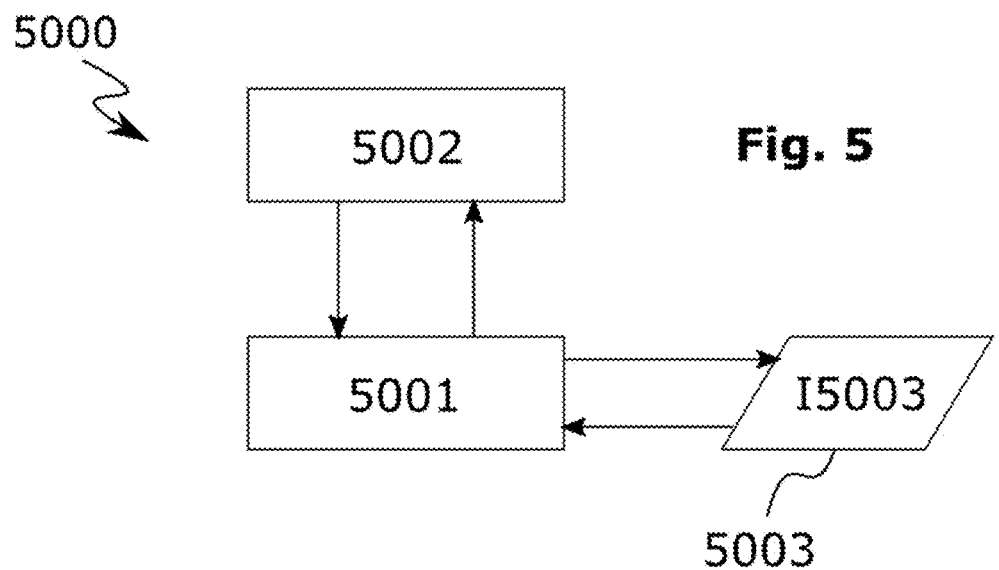
FIG. 5 is a representation of a data processing device according to the second aspect of the invention.

The method according to the first aspect of the invention is computer-implemented. With reference to FIG. 5, in a second aspect of the invention, a data processing device 5000 comprising means for implementing a method 2000 according to any one of the embodiments of the first aspect of the invention is provided.

One example of a device may be a device which is responsible for automatically executing sequences of arithmetic or logic operations in order to carry out tasks or actions. This device, also called a computer, may comprise one or more central processing units (CPUs) and/or one or more graphics processors (GPUs) 5001 as well as at least one control device which is suitable for executing these operations. It may also comprise other electronic components such as input/output interfaces 5002, non-volatile or volatile storage devices 5003, and communication buses for transferring data between the internal components of the device or with external components. One of the input/output devices 5002 may be a user interface for human-machine interaction, for example a graphical user interface for displaying information which is understandable to humans.

According to a third aspect of the invention, a computer program 15003 comprising instructions which, when the program is executed by a computer, lead the latter to implement a method 2000 according to any one of the embodiments of the first aspect of the invention is provided.

Any type of compiled or interpreted programming language may be used to implement the steps of the method of the invention. The computer program may form part of a software solution, that is to say a collection of executable instructions, codes, scripts or the like and/or databases.

According to a fourth aspect of the invention, a computer-readable storage medium 5003 comprising instructions which, when they are executed by a computer, lead the latter to implement a method 2000 according to any one of the embodiments of the first aspect of the invention is provided.

The computer-readable storage medium 5003 is preferably a non-volatile memory, for example a hard disk or a semiconductor-based reader. It may be a removable storage medium or a non-removable storage medium forming part of a computer.

The computer-readable storage medium 5003 may also be a volatile memory inside a removable medium. This may facilitate the deployment of the invention in numerous production sites.

The computer-readable storage medium 5003 may form part of a computer used as a server from which executable instructions may be downloaded which, when they are executed by a computer, cause the computer to execute a method according to one of the embodiments described in the present document.

The computer program 15003 and the medium 5003 on which it is stored may be implemented in a distributed computing environment, for example cloud computing. The instructions may be executed on a server to which one or more client computers may connect and provide data encoded as input data for a method according to any one of the embodiments of the first aspect of the invention. Once the data have been processed, the result may be downloaded onto and decoded on the client computer or be sent directly, for example, in the form of instructions.

According to a fifth aspect of the invention, a computer-implemented method for identifying a dactylogram among a set of dactylograms comprising at least one candidate dactylogram is provided, said method taking, as input data, the coordinates associated with each minutia from a list of minutiae of a dactylogram to be identified and supplying, as output datum, a match score of said dactylogram to be identified with at least one candidate dactylogram, said method comprising the following steps:

(a) encoding the coordinates associated with each minutia from a list of minutiae of said dactylogram to be identified as a fixed-size vector using an encoding method according to any one of the embodiments of a method in accordance with the first aspect of the invention;

(b) providing a database containing a set of dactylograms comprising at least one candidate dactylogram and in which the coordinates associated with each minutia from a list of minutiae of each of the candidate dactylograms from said set are encoded as a fixed vector using an encoding method according to any one of the embodiments of a method in accordance with the first aspect of the invention;

(c) calculating a match score between the vector calculated in step (a) and each of the vectors from the database;

(d) selecting the highest score among the scores calculated in step (c).

In step (c), the match score between the vector calculated in step (a) and each of the vectors from the database can be calculated in any suitable way. By way of example, it may be a scalar product, a vector product or an Euclidean distance.

According to a sixth aspect of the invention, a system for identifying a dactylogram with at least one candidate dactylogram is provided, said system comprising:

a storage medium on which a database containing a set comprising at least one candidate dactylogram is stored and in which database the coordinates associated with each minutia from a list of minutiae of each of the candidate dactylograms from said set are encoded as a fixed vector using an encoding method according to any one of the embodiments of a method in accordance with the first aspect of the invention;

a data processing device, for example a computer, comprising means for implementing an identification method according to the fifth aspect of the invention.

According to certain embodiments, the system furthermore comprises a device for acquiring an image of a dactylogram, the device being configured to extract the coordinates of a list of minutiae from the image of a dactylogram which may be obtained by said acquisition device.

The acquisition device is of any suitable type. Some non-limiting examples of acquisition devices are described in US 2012 014569 A1, IB KOREA LTD [KR], Jan. 19, 2012 and US 2017 046554 A1, NEC CORP [JP], Feb. 16, 2017.

Extracting the coordinates of a list of minutiae from an image of a dactylogram is common practice. Some non-limiting examples of extraction methods are described in the articles BANSAL et al., Punam. Minutiae extraction from fingerprint images-a review. arXiv preprint arXiv: 1201.1422, 2011, and MOHSEN et al., Automatic Fingerprint Recognition Using Minutiae Matching Technique for the Large Fingerprint Database. arXiv preprint arXiv: 1304.2109, 2013. The acquisition devices from the prior art may easily be adapted to implement these methods, notably via their own data processing unit or the addition of a dedicated data processing unit.

Example

In an example of an embodiment, the encoding method takes, as input data, a list of the abscissa, ordinate and orientation angle values of 'n' minutiae of a dactylogram in the reference system of said dactylogram. Said method comprises the following steps:

(a) normalizing, for each minutia, abscissa, ordinate and orientation angle values, during which the orientation angles are replaced by the values of their sine and their cosine;

(b) concatenating the normalized values of the coordinates of each minutia in the form of a source matrix of dimension (n,4);

(c) projecting the source matrix using a projection matrix of dimension (4, 128) previously optimized (trained) to form a projected matrix of dimension (n, 128);

(d) concatenating the projected matrix with a coordinate vector of a dummy minutia of dimension (1, 128) in order to form an intermediate matrix of dimension (n+1, 128);

(e) inferring an inference matrix of dimension (n+1, 128) by applying a previously trained transformer graph neural network;

(f) aggregating the values of the inference matrix using a weighted sum between the values of the inference matrix for each dimension representing the coordinate vector of the dummy minutia V, the average of the values of the inference matrix for each dimension representing the minutiae of the projected matrix MP and the maximum of the values of the inference matrix for each dimension.

The transformer graph neural network comprises a succession of 9 multi-head self-attention mechanism layers alternating with a multi-layer perceptron neural network, and is devoid of positional encoding. This type of structure is described in section 3.1 and illustrated in FIG. 1 of the article VASWANI, Ashish et al. Attention is all you need. Advances in neural information processing systems, vol. 30, 2017.

The transformer graph neural network and the projection matrix are previously trained by an "identity" supervised learning method and a gradient descent learning method on a training set comprising the lists of minutiae of about 1 million 8 hundred thousand images of dactylograms in which there are at least 6 different images of the same dactylogram, respectively. In other words, the training set comprises the lists of minutiae of six images of three hundred thousand different dactylograms.

The performance of the method was evaluated by comparing the lists of minutiae encoded using an identification method according to the fifth aspect of the invention, a database of lists of minutiae being encoded for this purpose. The results of the evaluation are shown in FIG. 6, showing the change in the false negative rate (FRR) as a function of the false positive rate (FAR). For a threshold corresponding to 0.01% (10-2) false positives (FAR), the false negative occurrence rate (FRR) is only 6.2%. Since the method is capable, unlike prior art methods, of performing several million comparisons per second, such a rate value makes it particularly advantageous for use as a first step of rapid and accurate screening in an automated identification process.

REFERENCES

Patent Literature

US 2012 014569 A1, IB KOREA LTD [KR], Jan. 19, 2012.
US 2017 046554 A1, NEC CORP [JP], Feb. 16, 2017.

Non-Patent Literature

F. Galton, Fingerprint Directories. London, MacMillan & Co, 1895.
Henry Faulds, Guide to fingerprint Identification, Tokyo, Hanley, 1905.
E. Henry, Classification and uses of finger prints, published by his majesty's stationery office, London, 1913.
ISO/IEC 19794-2:2005, Information Technology—Biometric Data Interchange Formats—Part 2: Finger Minutiae Data, 2005.
BANSAL, Roli, SEHGAL, Priti, and BEDI, Punam. Minutiae extraction from fingerprint images—a review. arXiv preprint arXiv:1201.1422, 2011.
MOHSEN, S. M., FARHAN, S. M., and HASHEM, M. M. A. Automatic Fingerprint Recognition Using Minutiae Matching Technique for the Large Fingerprint Database. arXiv preprint arXiv:1304.2109, 2013.
VASWANI, Ashish, SHAZEER, Noam, PARMAR, Niki, et al. Attention is all you need. Advances in neural information processing systems, vol. 30, 2017.
DOSOVITSKIY, Alexey, BEYER, Lucas, KOLESNIKOV, Alexander, et al. An image is worth 16×16 words: Transformers for image recognition at scale. arXiv preprint arXiv:2010.11929, 2020.
GROSZ, Steven A., ENGELSMA, Joshua J., RANJAN, Rajeev, et al. Minutiae-guided fingerprint embeddings via vision transformers. arXiv preprint arXiv:2210.13994, 2022.
TANDON, Saraansh and NAMBOODIRI, Anoop. Transformer based fingerprint feature extraction. In: 2022 26th International Conference on Pattern Recognition (ICPR). IEEE, p. 870-876, 2022.
SU, Yapeng, ZHAO, Tong, and ZHANG, Zicheng. MRA-GNN: Minutiae Relation-Aware Model over Graph Neural Network for Fingerprint Embedding. arXiv preprint arXiv:2307.16416, 2023.

The invention claimed is:

1. A computer-implemented method for encoding a list of minutiae of a dactylogram, said method taking, as input data, the coordinates of each minutia from a list L of n minutiae of a dactylogram in an M-dimensional space E, and providing, as output datum, a fixed-size encoding vector VE which is representative of the list L of the n minutiae of said dactylogram, the method comprising the following steps:

(a) concatenating the coordinates of each minutia from the list L of n minutiae in the form of a source matrix MS of dimension (n, m);
(b) projecting the source matrix MS of dimension (n, m) into a P-dimensional space F, the number of dimensions P of the space F being greater than the number of dimensions M of the space E of the coordinates of each minutia, said projection being performed using a projection model Proj previously trained in order to form a projected matrix MP of dimension (n, p);
(c) inferring an inference matrix MF of dimension (n+1, p) by applying, to the intermediate matrix MI, the graph neural network previously trained to classify the dactylograms from a set of dactylograms on the basis of a list L of a plurality of minutiae of said dactylograms;
(d) aggregating the values of the inference matrix MF into a vector VE of fixed size (1, p) using a previously defined aggregation model, said fixed-size vector being the fixed-size encoding vector VE which is representative of the list L of the minutiae of the dactylogram.

2. The method as claimed in claim 1, such that it further comprises, after step (b) and before step (c), a step (b2) of concatenating the projected matrix with a coordinate vector of a dummy minutia V of dimension (1, p) in order to form an intermediate matrix MI of dimension (n+1, p), the coordinate vector of the dummy minutia V having previously been determined during the training of the graph neural network.

3. The method as claimed in claim 1, such that the graph neural network is a transformer neural network.

4. The method as claimed in claim 3, such that the transformer neural network comprises a succession of at least 9 multi-head self-attention mechanism layers alternating with a multilayer perceptron neural network, and is devoid of positional encoding.

5. The method as claimed in claim 1, such that the aggregation model is a weighted sum, for each dimension P of the space F, between the values of the inference matrix MF, previously corresponding to the coordinates of the vector of the dummy minutia V, the average of the values of the interference matrix MF previously corresponding to the projected matrix MP and the maximum of the values of the inference matrix MF.

6. The method as claimed in claim 1, such that the space E is of dimension 3 and the coordinates of the minutiae correspond to the values of its abscissa, of its ordinate and of its orientation angle in the reference system (X, Y) of the dactylogram, respectively.

7. The method as claimed in claim 1, such that it further comprises, before step (a), a previous step of normalizing the coordinates of each minutia in which the orientation angles are replaced by the values of their sine and of their cosine.

8. The method as claimed in claim 1, such that the projection model Proj is a projection matrix MP into a space F the number P of dimensions of which is arbitrary, preferably into a space F of arbitrary dimension P of at least 32 times the dimension M of the space E.

9. A data processing device comprising means for implementing the method as claimed in claim 1.

10. A computer program comprising instructions which, when the program is executed by a computer, lead the latter to implement the method as claimed in claim 1.

11. A computer-readable storage medium comprising instructions which, when they are executed by a computer, lead the latter to implement the method as claimed in claim 1.

12. A computer-implemented method for identifying a dactylogram among a set of dactylograms comprising at least one candidate dactylogram, said method taking, as input data, the coordinates associated with each minutia from a list of minutiae of a dactylogram to be identified and supplying, as output datum, a match score of said dactylogram to be identified with at least one candidate dactylogram, said method comprising the following steps:
  (a) encoding the coordinates associated with each minutia from a list of minutiae of said dactylogram to be identified as a fixed-size vector using an encoding method as claimed in claim 1;
  (b) providing a database containing a set of dactylograms comprising at least one candidate dactylogram and in which the coordinates associated with each minutia from a list of minutiae of each of the candidate dactylograms from said set are encoded as a fixed vector using an encoding method as claimed in claim 1;
  (c) calculating a match score between the vector calculated in step (a) and each of the vectors from the database;
  (d) selecting the highest score among the scores calculated in step (c).

13. A system for identifying a dactylogram with at least one candidate dactylogram, said system comprising:
  a storage medium on which a database containing a set comprising at least one candidate dactylogram is stored and in which database the coordinates associated with each minutia from a list of minutiae of each of the candidate dactylograms from said set are encoded as a fixed vector using an encoding method as claimed in claim 1;
  a data processing device comprising a computer-readable storage medium comprising instructions which, when they are executed by a computer, lead the latter to implement the encoding method.

14. The system as claimed in claim 13, further comprising a device for acquiring an image of a dactylogram and wherein the device is further configured to extract the coordinates of a list of minutiae from the image of a dactylogram which may be obtained with said device.

* * * * *